(12) United States Patent
Coplen et al.

(10) Patent No.: US 10,705,783 B2
(45) Date of Patent: **\*Jul. 7, 2020**

(54) SHOWING INTERACTIONS AS THEY OCCUR ON A WHITEBOARD

(71) Applicant: Microsoft Technology Licensing, LLC, Redmond, WA (US)

(72) Inventors: C. Joe Coplen, Kirkland, WA (US); David Landis, Redmond, WA (US); Keri Talbot, Seattle, WA (US); Gary Caldwell, Redmond, WA (US); Nathan Fish, Seattle, WA (US); Sarah Faulkner, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 67 days.

This patent is subject to a terminal disclaimer.

(21) Appl. No.: 15/297,288

(22) Filed: Oct. 19, 2016

(65) Prior Publication Data

US 2017/0039022 A1    Feb. 9, 2017

Related U.S. Application Data

(63) Continuation of application No. 13/925,545, filed on Jun. 24, 2013, now Pat. No. 9,489,114.

(51) Int. Cl.
*G06F 3/14*        (2006.01)
*H04L 12/58*      (2006.01)
(Continued)

(52) U.S. Cl.
CPC .......... *G06F 3/1454* (2013.01); *G06F 3/0481* (2013.01); *G06F 3/0488* (2013.01);
(Continued)

(58) Field of Classification Search
CPC ..... G06F 3/1454; G06F 3/04883; H04L 51/10
See application file for complete search history.

(56) References Cited

U.S. PATENT DOCUMENTS 5,025,314 A       6/1991   Tang et al.
5,583,993 A  *  12/1996   Foster ................... G06F 3/1454
                                                                    709/205
(Continued)

FOREIGN PATENT DOCUMENTS

CN           102866819 A          1/2013
WO        WO 9930494 A1  *   6/1999  ............... H04N 7/15
WO         2012/162411 A1    11/2012

OTHER PUBLICATIONS

"First Office Action and Search Report Issued in Chinese Patent Application No. 201480036147.4", dated Jan. 19, 2018, 12 Pages.
(Continued)

*Primary Examiner* — Nitin Patel
*Assistant Examiner* — Robert M Stone
(74) *Attorney, Agent, or Firm* — Merchant & Gould

(57) ABSTRACT

Real-time interactions made by a client on a whiteboard are shown on remote client(s) currently viewing the whiteboard. The real-time interactions that are shown on the remote clients can include a variety of different interactions. For example, the location(s) of where a remote client is touching the whiteboard or interacting with the whiteboard using a stylus may be viewed. A current inking stroke of a remote user may also be viewed as it is occurring. Interactions on the whiteboard may be shown differently depending on the remote user performing the interaction. The whiteboard may also show a location on the whiteboard where each of the remote users are currently viewing. A user may also track the actions of another user. When a change is committed to the whiteboard, the remote clients update the display to reflect the committed state.

20 Claims, 12 Drawing Sheets

(51) Int. Cl.
  *G06F 3/0488* (2013.01)
  *G06F 3/0484* (2013.01)
  *H04L 29/06* (2006.01)
  *G06F 3/0481* (2013.01)
  *G06F 3/0354* (2013.01)

(52) U.S. Cl.
  CPC ...... *G06F 3/04847* (2013.01); *G06F 3/04883* (2013.01); *H04L 51/04* (2013.01); *H04L 51/10* (2013.01); *H04L 65/403* (2013.01); *G06F 3/03545* (2013.01)

(56) References Cited

U.S. PATENT DOCUMENTS

| | | | |
|---|---|---|---|
| 5,920,694 A * | 7/1999 | Carleton | G06F 3/0481 |
| | | | 348/E7.083 |
| 5,966,512 A * | 10/1999 | Bates | G06F 17/2288 |
| | | | 709/201 |
| 6,072,463 A | 6/2000 | Glaser | |
| 6,728,784 B1 | 4/2004 | Mattaway | |
| 7,373,590 B2 | 5/2008 | Woolf et al. | |
| 7,508,354 B1 | 3/2009 | Sanders et al. | |
| 7,747,688 B2 | 6/2010 | Narayanaswami et al. | |
| 7,774,703 B2 * | 8/2010 | Junuzovic | G06Q 10/10 |
| | | | 715/229 |
| 8,390,718 B2 * | 3/2013 | Robinson | H04N 7/15 |
| | | | 348/14.01 |
| 8,402,391 B1 | 3/2013 | Doray et al. | |
| 9,396,279 B1 * | 7/2016 | O'Donnell | G06F 16/958 |
| 2003/0206203 A1 * | 11/2003 | Ly | G06Q 10/10 |
| | | | 715/853 |
| 2004/0165768 A1 * | 8/2004 | Zhang | H04L 29/06027 |
| | | | 382/162 |
| 2004/0221043 A1 | 11/2004 | Su et al. | |
| 2004/0237033 A1 * | 11/2004 | Woolf | G06F 17/242 |
| | | | 715/211 |
| 2005/0180631 A1 * | 8/2005 | Zhang | G06T 5/50 |
| | | | 382/173 |
| 2006/0274057 A1 * | 12/2006 | Van Ness | G06F 3/04883 |
| | | | 345/179 |
| 2007/0106950 A1 | 5/2007 | Hutchinson et al. | |
| 2007/0186171 A1 | 8/2007 | Junuzovic et al. | |
| 2007/0245238 A1 | 10/2007 | Fugitt et al. | |
| 2008/0046828 A1 | 2/2008 | Bibliowicz et al. | |
| 2008/0184124 A1 * | 7/2008 | Agarwal | G06Q 10/10 |
| | | | 715/733 |
| 2009/0244278 A1 | 10/2009 | Taneja et al. | |
| 2010/0257457 A1 * | 10/2010 | De Goes | G06Q 10/10 |
| | | | 715/751 |
| 2010/0261466 A1 | 10/2010 | Chang et al. | |
| 2011/0161821 A1 | 6/2011 | Stewart | |
| 2011/0246875 A1 | 10/2011 | Parker et al. | |
| 2011/0279350 A1 * | 11/2011 | Hutchinson | G09B 5/067 |
| | | | 345/1.1 |
| 2011/0310118 A1 * | 12/2011 | Asmi | G06F 3/04883 |
| | | | 345/619 |
| 2011/0320961 A1 | 12/2011 | Sriraghavan et al. | |
| 2012/0016960 A1 | 1/2012 | Gelb et al. | |
| 2012/0221960 A1 * | 8/2012 | Robinson | G06F 3/0488 |
| | | | 715/751 |
| 2012/0229425 A1 * | 9/2012 | Barrus | G06F 3/04883 |
| | | | 345/179 |
| 2012/0231441 A1 | 9/2012 | Parthasarathy et al. | |
| 2012/0233615 A1 * | 9/2012 | Barrus | G06F 21/31 |
| | | | 718/100 |
| 2012/0260195 A1 | 10/2012 | Hon et al. | |
| 2012/0280948 A1 * | 11/2012 | Barrus | G06F 3/04883 |
| | | | 345/179 |
| 2012/0327105 A1 | 12/2012 | Rowley et al. | |
| 2013/0047093 A1 | 2/2013 | Reuschel et al. | |
| 2013/0047095 A1 | 2/2013 | Divorra Escada et al. | |
| 2013/0055143 A1 * | 2/2013 | Martin | G06F 3/0425 |
| | | | 715/779 |
| 2013/0111360 A1 | 5/2013 | Kodama et al. | |
| 2013/0144950 A1 | 6/2013 | Sanakaranarasimhan et al. | |
| 2013/0346910 A1 | 12/2013 | Mason | |
| 2014/0019520 A1 | 1/2014 | Milburn et al. | |
| 2014/0149857 A1 * | 5/2014 | Vagell | G06F 40/166 |
| | | | 715/255 |
| 2014/0149880 A1 | 5/2014 | Farouki | |
| 2014/0207874 A1 * | 7/2014 | Soorianarayanan | H04L 65/403 |
| | | | 709/206 |
| 2014/0372852 A1 * | 12/2014 | Rothschiller | G06F 40/197 |
| | | | 715/212 |
| 2016/0139768 A1 * | 5/2016 | Lemonik | G06F 3/04812 |
| | | | 715/753 |

OTHER PUBLICATIONS

"Final Office Action Issued in U.S. Appl. No. 13/925,545", dated Dec. 3, 2015, 23 Pages.

"Non Final Office Action Issued in U.S. Appl. No. 13/925,545", dated Apr. 9, 2015, 19 Pages.

"Notice of Allowance Issued in U.S. Appl. No. 13/925,545", dated Jun. 21, 2016, 9 Pages.

Greenberg, et al., "Issues and Experiences Designing and Implementing Two Group Drawing Tools", In Proceedings of the 25th Hawaii International Conference on System Sciences, Jan. 7, 1992, pp. 139-150.

"International Preliminary Report on Patentability Issued in PCT Application No. PCT/US2014/041032", dated Sep. 8, 2015, 10 Pages.

Streng, et al., "Measuring Effects of Private and Shared Displays in Small-Group Knowledge Sharing Processes", In Proceedings of the 6th Nordic Conference on Human-Computer Interaction: Extending Boundaries, Oct. 16, 2010, 4 pages.

International Search Report and Written Opinion for PCT/US2014/041032 dated Aug. 28, 2014.

"Office Action Issued in Chinese Patent Application No. 201480036147.4", dated Oct. 10, 2018, 7 Pages.

* cited by examiner

Mobile Computing Device

SHOWING INTERACTIONS AS THEY OCCUR ON A WHITEBOARD

CROSS REFERENCE TO RELATED APPLICATIONS

This application is a continuation of U.S. patent application Ser. No. 13/925,545, filed Jun. 24, 2013, entitled "Showing Interactions As They Occur On A Whiteboard," and now U.S. Pat. No. 9,489,114, the disclosure of which is incorporated by reference herein in its entirety.

BACKGROUND

Different computer applications such as notebook applications and whiteboard applications allow a user to view and save a variety of different content. These applications are typically used for free-form information gathering. For example, an application may allow a user to include notes, links, web pages, pictures, documents, and the like on a canvas. Different users may be able to share the canvas. For example, different users may be allowed to read the canvas, edit content on the canvas, and the like.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Real-time interactions made by a client on a whiteboard are shown on remote client(s) currently viewing the whiteboard. The real-time interactions that are shown on the remote clients can include a variety of different interactions. For example, the location(s) of where a remote client is touching the whiteboard or interacting with the whiteboard using a stylus may be viewed. A current inking stroke of a remote user may also be viewed as it is occurring. For example, the position of the stylus may be sent to the remote clients before the inking is recognized. Interactions on the whiteboard may be shown differently depending on the remote user performing the interaction. For example, each different remote user's interactions may be shown in a different color on the whiteboard. The whiteboard may also show a location on the whiteboard where each of the remote users are currently viewing. A user may also track the actions of another user. For example, when a user is tracking the actions of another user, the view of the whiteboard changes when the remote user changes their view. When a change is committed to the whiteboard, the remote clients update the display to reflect the committed state. For example, when an ink change notification is received, the real-time ink information may need to be updated to reflect the committed result. Real-time information may also include when a user enters the whiteboard and when the user leaves the whiteboard.

DETAILED DESCRIPTION

Figure 1:
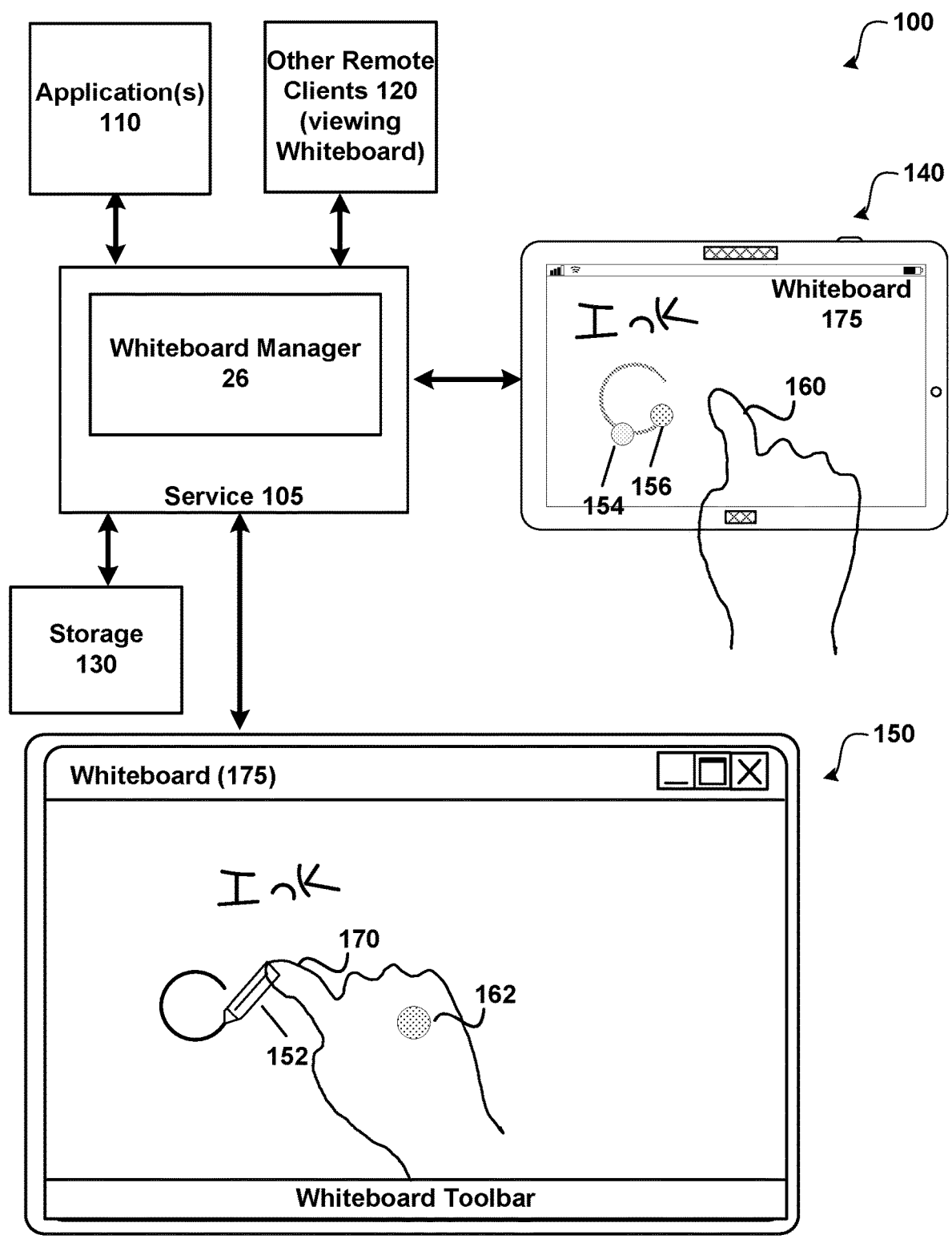
FIG. 1 shows a system showing interactions on a whiteboard as they occur.

Referring now to the drawings, in which like numerals represent like elements, various embodiment will be described elements, various embodiment will be described.

FIG. 1 shows a system showing interactions on a whiteboard as they occur. As illustrated, system 100 includes application(s) 110, remote clients 120, storage 130, whiteboard manager 26, service 105, tablet computing device 140, and computing device 150. Whiteboard manager 26 is configured to perform operations relating to showing real-time interactions made by a user on a whiteboard to remote clients that are also viewing the whiteboard.

Tablet 140 shows user 160 touching whiteboard 175. In response to detecting the touch interaction, whiteboard manager 26 sends real-time interaction information to other remote clients 120 that are interacting with whiteboard 175. In the current example, computing device 150 shows a view of a remote client interacting with the same whiteboard as user 160. Whiteboard manager 26 sends the real-time interaction information including the touch interaction from user 160 to computing device 150 such that the touch interaction 162 by user 160 is shown on the display of the whiteboard.

User 170 is performing an inking operation on whiteboard 175. Information relating to the current inking stroke of user 170 is received by whiteboard manager 26 and delivered to the other remote clients 120. As can be seen, a "C" is shown on whiteboard 175 that is displayed on tablet 140. According to an embodiment, while an interaction that is associated with an action is not yet committed by the whiteboard, the interaction is displayed differently than from a committed state. For example, the "C" is shown in a lighter color on remote devices before the inking commitment is received from whiteboard manager 26. Other display methods may be used (e.g. the same color, highlighting, different colors, and the like). A current location of the inking 156 is shown along with a previous location of the inking 154 is shown.

When a change is committed to whiteboard 175 by whiteboard manager 26, the remote clients update the display to reflect the committed state. After the change is committed, each of the displayed whiteboards includes a same display of the committed item. For example, when an ink change notification is received, the real-time ink information is updated to reflect the committed result.

The real-time interactions that are shown on the remote clients can include a variety of different interactions. For example, the location(s) of where a remote client is touching the whiteboard or interacting with the whiteboard using a device (e.g. mouse, stylus, pointer, . . . ) may be viewed. For example, the position of the stylus may be sent to the remote clients before the inking is recognized. Interactions received by different users on the whiteboard may be shown differently by whiteboard manager 26. For example, each different user's interactions may be shown in a different color on the whiteboard. The whiteboard manager 26 may also show a location where each of the remote users are currently viewing. A user may also track the actions of another user. For example, when a user is tracking the actions of another user, whiteboard manager 26 changes the view of the whiteboard when the remote user being tracked changes their view. Real-time information may also include when a user enters the whiteboard and when the user leaves the whiteboard.

In order to facilitate communication with whiteboard manager 26, one or more callback routines, may be implemented. Application(s) 110 may be a variety of applications, such as whiteboard applications, business productivity applications, entertainment applications, music applications, travel applications, video applications, and the like. Generally, application(s) 110 may be any application that uses a whiteboard. The application(s) 110 may be configured to receive different types of input (e.g. speech input, touch input, keyboard input (e.g. a physical keyboard and/or Software Input Panel (SIP)) and/or other types of input. Storage 130 stores content related to a whiteboard. Service 105 is a service that is configured to provide whiteboard services. While whiteboard manager 26 is shown within service 105, the functionality of whiteboard manager 26 may be in different locations. For example, all/portion of the functionality may be on a client computing device or divided between other computing devices.

System 100 as illustrated comprises one or more touch screen input devices, such as tablet computing device 140 and computing device 150, that detects when a touch input has been received (e.g. a finger touching or nearly touching the touch screen). Any type of touch screen may be utilized that detects a user's touch input. More details are provided below.

Figure 2:
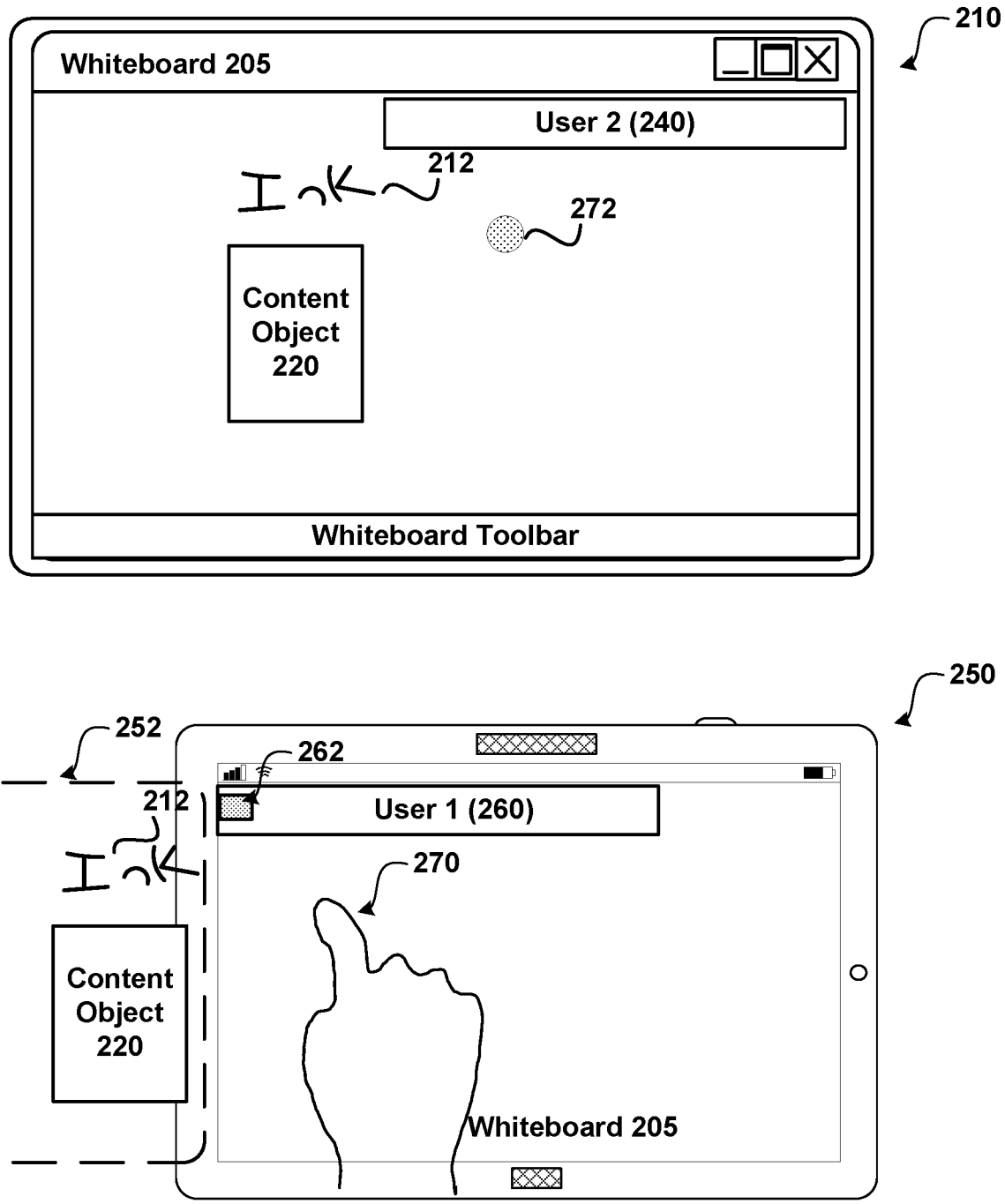
FIG. 2 shows the locations on the whiteboard where other remote users are currently viewing.

FIG. 2 shows the locations on the whiteboard where other remote users are currently viewing. As illustrated, display 210 includes a display of whiteboard 205 that is being viewed by User 1. A whiteboard, such as whiteboard 205, may store many different types of content. For example, a whiteboard may include, but is not limited to: typed and handwritten notes, documents, links, web pages, shared displays, tables and charts, sketches, videos and other media, and the like. As illustrated, the current view of whiteboard 205 by User 1 shows Ink 212, content object 220 and touch interaction 272. Touch interaction 272 shows a location 270 on the whiteboard where User 2 is currently touching. View indicator 240 shows the location on whiteboard 205 where User 2 is currently viewing. In the current example, indicator 240 shows that User 2 cannot currently see content object 220 or Ink 212. According to an embodiment, each remote user's location on the whiteboard may be shown. A user may selectively turn on or turn off the display of all or a portion of the remove view indicators.

Display 250 includes a display of whiteboard 205 that is being viewed by User 2. As illustrated, the current view of whiteboard 205 by User 2 shows User 2 touching the whiteboard. Whiteboard 205 also shows a view indicator 260 that shows the current location of User 1 on whiteboard 205. View indicator 260 shows indicator 262 that indicates that the view of User 1 extends to the left of the current display for User 2. Display 252 shows the portion of the whiteboard that User 1 is viewing including Ink 212 and content object 220 but cannot be seen by User 2.

Figure 3:
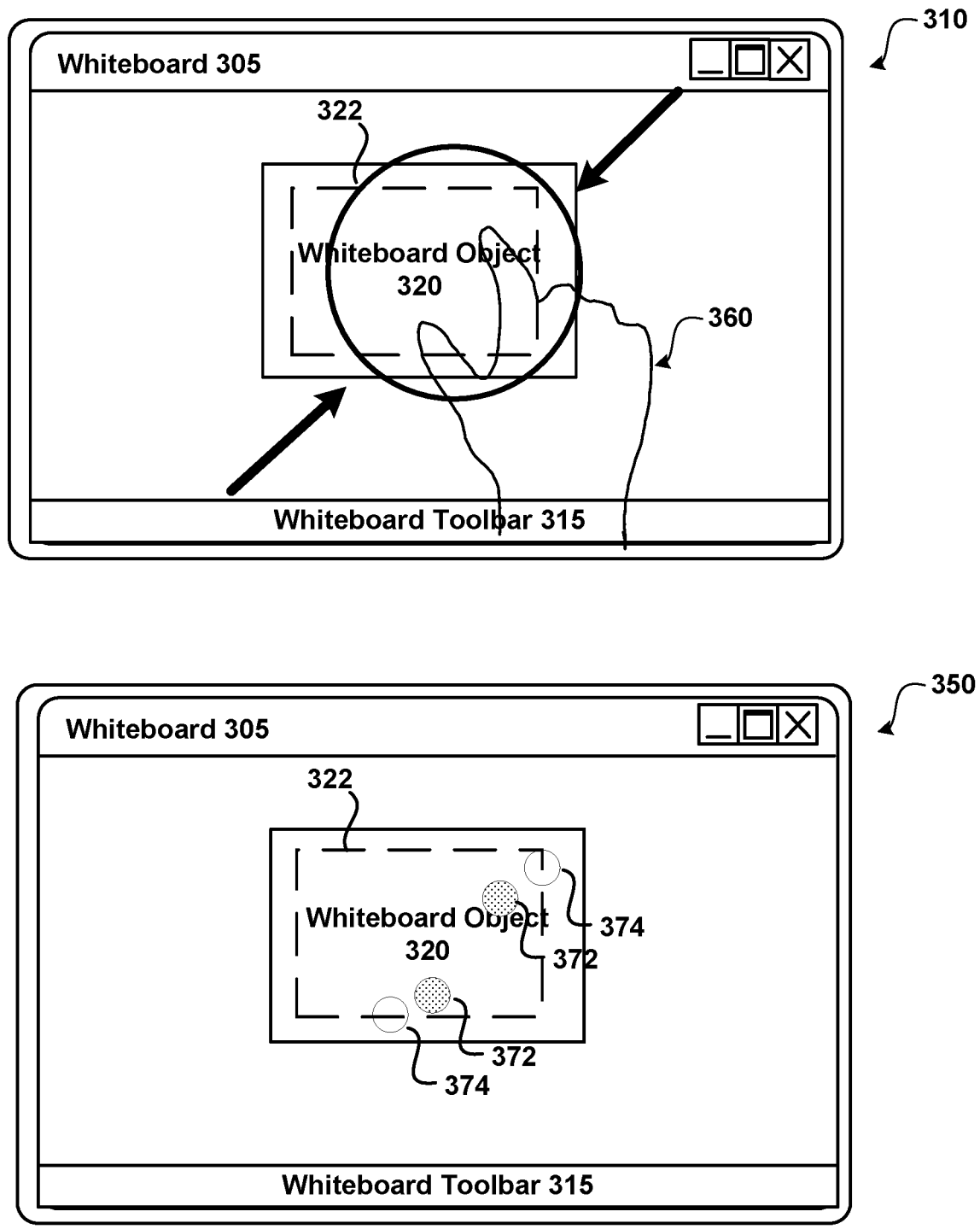
FIG. 3 illustrates showing touch interactions for a resize operation as they occur on a whiteboard.

FIG. 3 illustrates showing touch interactions for a resize operation as they occur on a whiteboard. Display 310 shows whiteboard 305 that includes whiteboard object 320. Whiteboard object 320 may be any whiteboard object (e.g. picture, document, video, . . . ). In the current example, user 360 is performing a resize operation to shrink the whiteboard object 320 to size 322. For instance, user 360 may perform a pinch gesture (that may or may not be touching the display) to change the size of whiteboard object 320. A user may also perform a stretch gesture to increase the size of an object.

Display 350 shows whiteboard 305 that is being viewed by a remote user. In response to user 360 interacting with whiteboard 305, the real-time interaction information is delivered to the remote users viewing whiteboard 305. The current real-time interaction information shows a first state of the remote user's touch (touches 374) and a second state of the remote user's touch. As illustrated, the most current touch inputs (touches 372) are illustrated differently from older touch locations (touches 372) related to the current interaction. According to an embodiment, the resizing of whiteboard object 320 may also be shown on the whiteboard display for the remote user(s).

Whiteboard toolbar 315 includes different options relating to the whiteboard. For example, a user could select whiteboard toolbar 315 to turn on or turn off various options. The user may set whether or not to see touch interactions, display preferences associated with showing a location of a user, what types of interactions to display, and the like.

Figure 4:
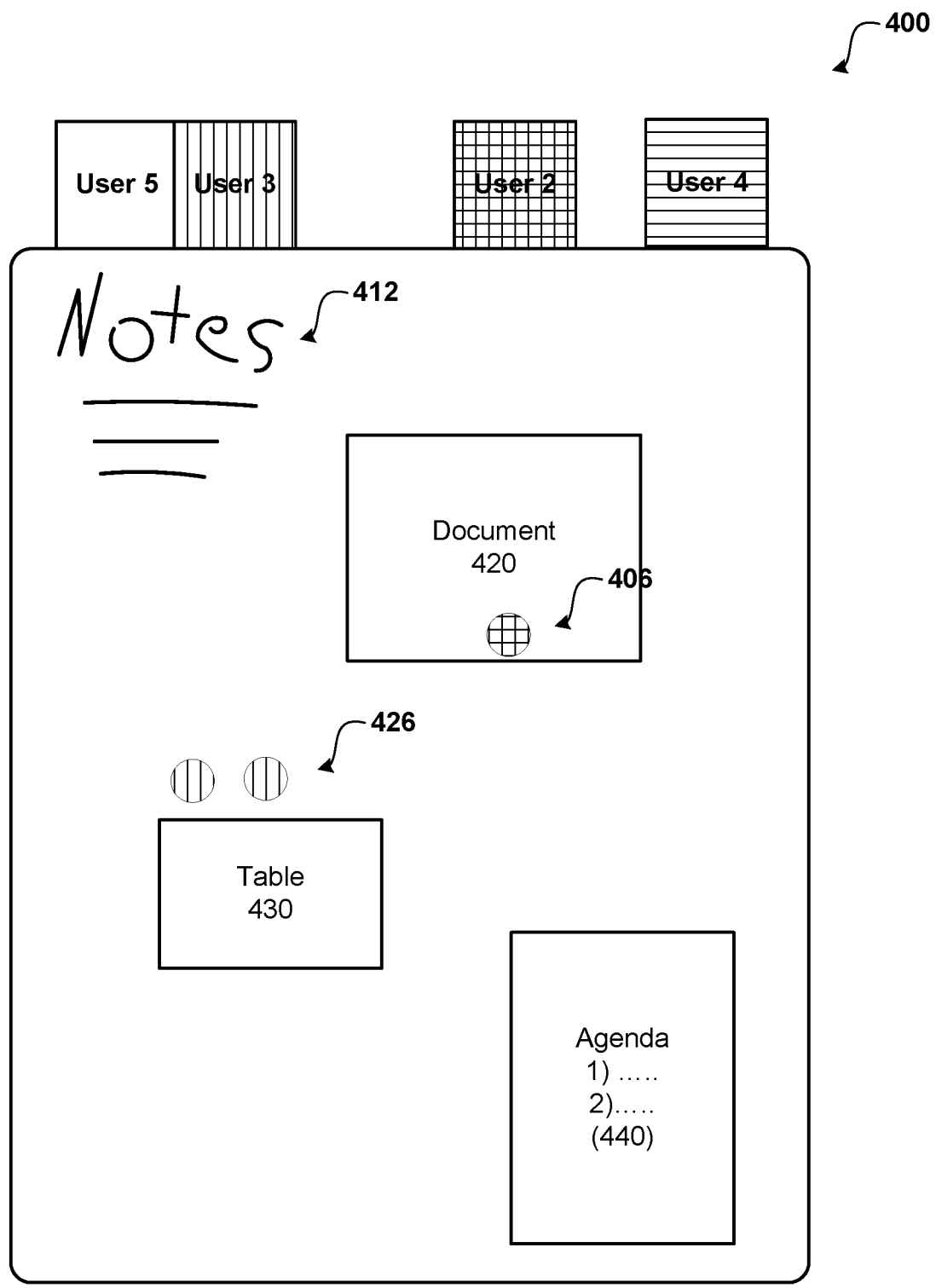
FIG. 4 shows different remote users locations and their interactions on a whiteboard.

FIG. 4 shows different remote users locations and their interactions on a whiteboard. In the current example, whiteboard 400 is being interacted with by five users including local User 1, remote User 2, remote User 3, remote User 4 and remote User 5. The view of whiteboard 400 by User 1 (the view illustrated) includes handwritten notes 412, document 420, table 430, and agenda 440. Whiteboard 400 also includes a view of the different remote user locations on the whiteboard. In the current example, User 5 and User 3 are associated with a same or similar location of whiteboard 400 and User 2 and User 4. For example, User 3 may be tracking the view of User 5.

According to an embodiment, when a remote user interacts with whiteboard 400, the interaction is displayed on the local user's view of the whiteboard such that the local user can readily determine what remote user is making the interaction. For example, interaction 406 shows a touch interaction by User 2. Interactions 426 show touch interactions by User 3. While different patterns are shown to differentiate different remote user interactions, other display methods may be used (e.g. different colors).

Figure 5:
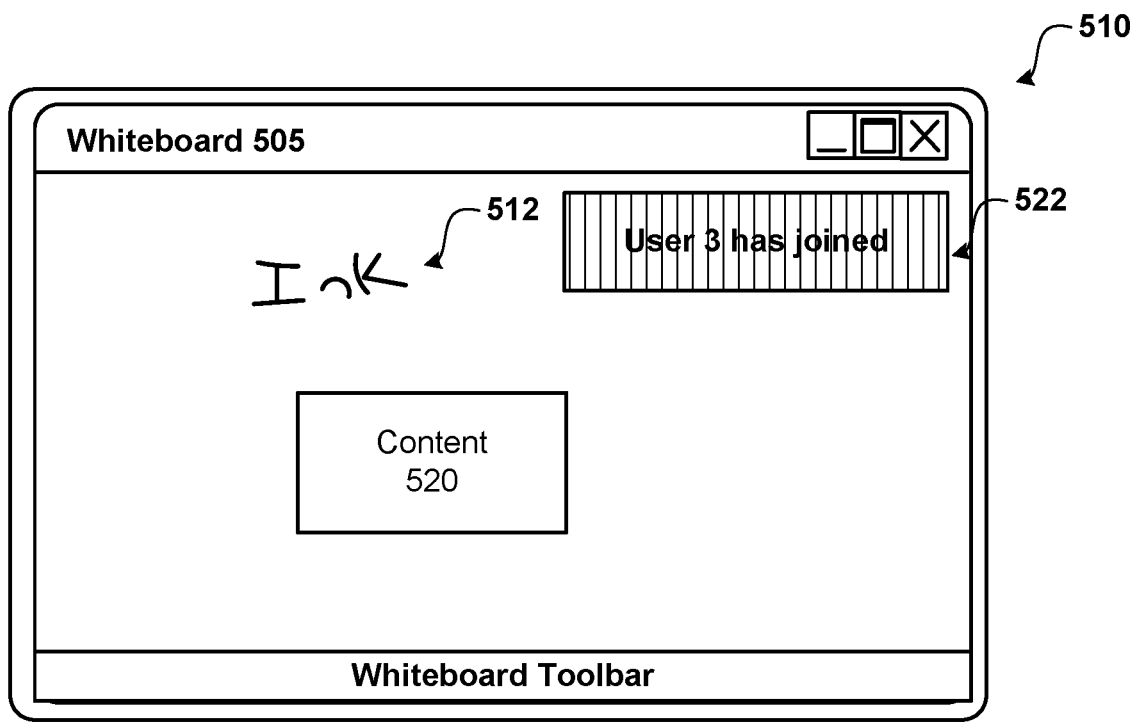
FIG. 5 shows a user entering the whiteboard and leaving the whiteboard.
Figure 5:
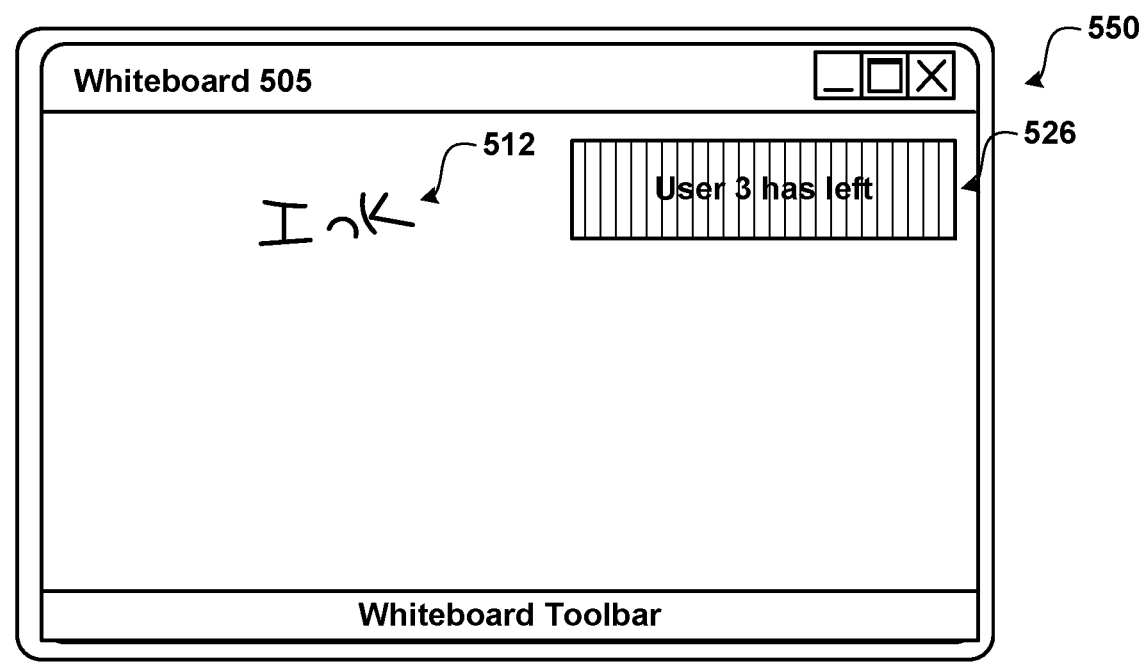

FIG. 5 shows a user entering the whiteboard and leaving the whiteboard. Display 510 shows whiteboard 505 including ink content 512 and content 520. Presence indictor 522 is displayed in response to a remote user joining whiteboard 505. In the current example, presence indicator 522 shows that User 3 has joined whiteboard 505.

Display 550 shows whiteboard 505 including ink content 512. For example, content 520 may have been removed from whiteboard since the time User 3 joined the whiteboard. Presence indictor 526 is displayed in response to a remote user leaving whiteboard 505. In the current example, presence indicator 522 shows that User 3 has left whiteboard 505.

Figure 6:
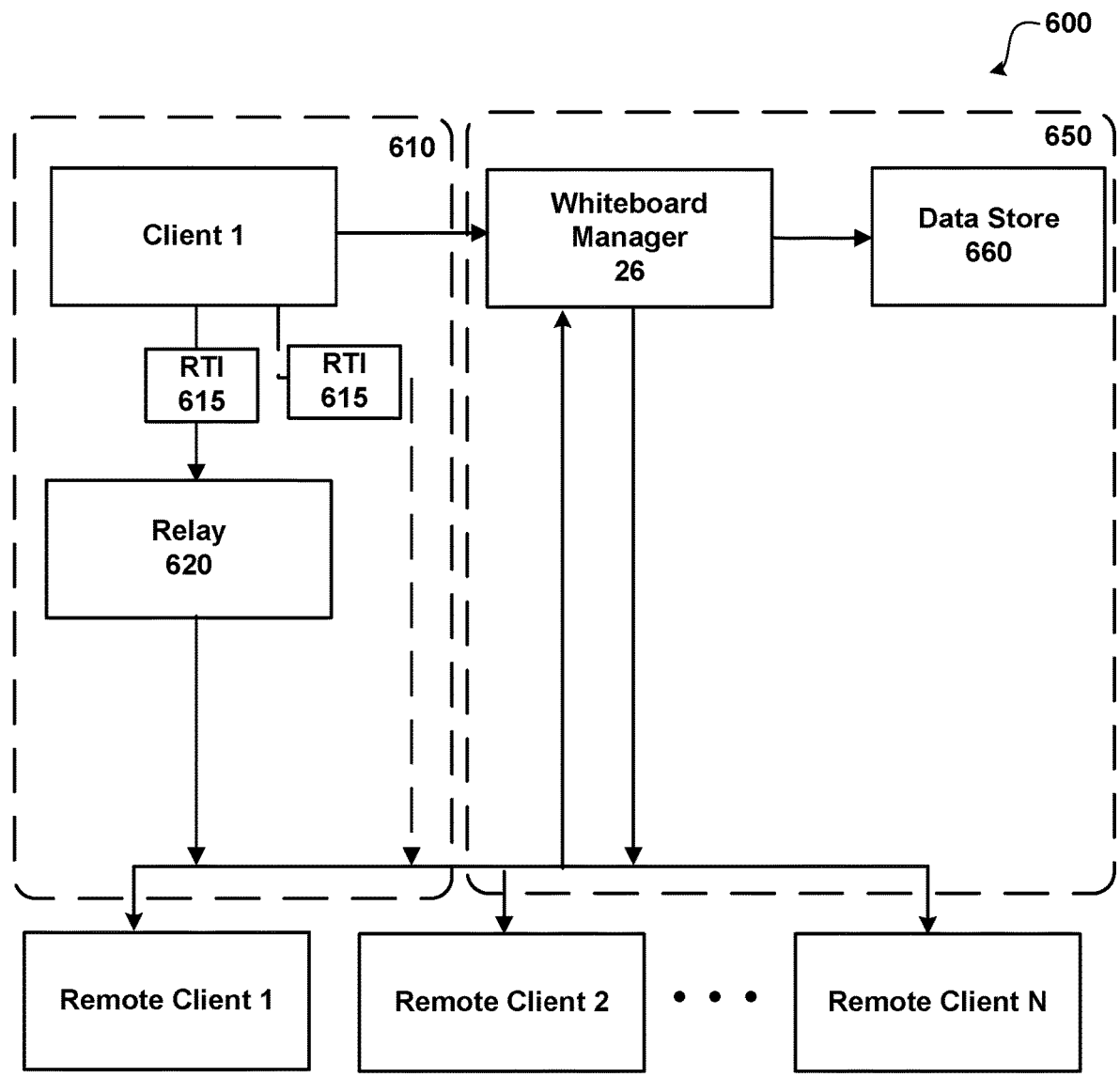
FIG. 6 shows a system using a real-time communication channel and a persistence channel for showing interactions on a whiteboard.

FIG. 6 shows a system using a real-time communication channel and a persistence channel for showing interactions on a whiteboard. As illustrated, system 600 shows client 1, relay 620, whiteboard manager 26, data store 660, and remote clients 1-N.

System 600 shows the use of a real-time communication channel 610 and a persistence communication channel 650. Real-time communication channel 610 is used to transmit the real-time interaction information to remote clients. Client 1 may transmit the real-time interaction information (RTI 615) directly to the remote clients (e.g. remote clients 1-N). Alternatively, Client 1 may transmit the real-time interaction information (RTI 615) to the remote clients (e.g. remote clients 1-N) using one or more relays, such as relay 620.

According to an embodiment, persistence channel 650 is used to send changes to the whiteboard that have been committed to the whiteboard. Communication information transmitted using persistence channel 650 is generally not as time sensitive as communication information transmitted using real-time communication channel 610. As Client 1 makes a change to the whiteboard (e.g. as adding an ink stroke), the change is submitted to whiteboard manager 26 for processing. Whiteboard manager 26 then attempts to persist the change information to a data store 660. After whiteboard manager 26 has successfully committed the change information to data store 660, the change information is delivered to each of the remote clients currently accessing the whiteboard. According to an embodiment, the change notification includes an identifier of the whiteboard object that was changed, a version number of the whiteboard object, a timestamp of when the change occurred and a type of the change (e.g. added, updated, deleted).

After a remote client (e.g. any of Remote Clients 1-N) has received the change notification, the remote client requests the whiteboard object identified in the change notification. In response to the request, whiteboard manager 26 sends the whiteboard object to the remote client. The remote client then merges the changed properties of the requested whiteboard object element. According to an embodiment, either the real-time channel 610 or the persistence channel 650 can be used to broadcast state changing events that are not considered time sensitive such as remote clients entering the whiteboard or remote clients leaving the whiteboard.

Figure 7:
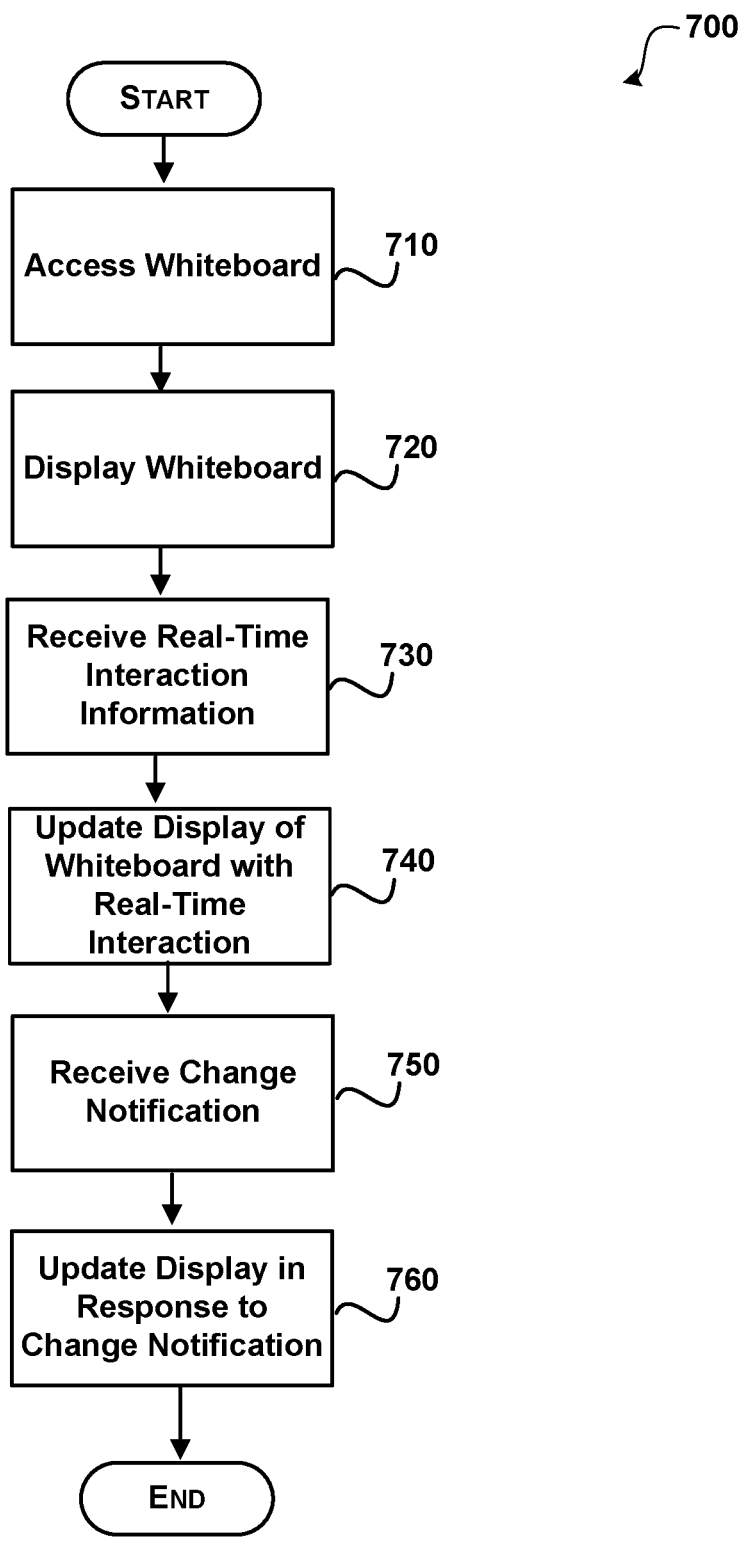
FIG. 7 illustrates showing interactions as they occur on a whiteboard.

FIG. 7 illustrates showing interactions as they occur on a whiteboard. When reading the discussion of the routines presented herein, it should be appreciated that the logical operations of various embodiments are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations illustrated and making up the embodiments described herein are referred to variously as operations, structural devices, acts or modules. These operations, structural devices, acts and modules may be implemented in software, in firmware, in special purpose digital logic, and any combination thereof. While the operations are shown in a particular order, the order of the operations may change, be performed in parallel, depending on the implementation.

After a start operation, the process moves to operation 710, where a whiteboard is accessed. The whiteboard may be accessed using different types of computing devices, such as desktop computing devices, laptop computing devices, tablets, smart phones, and the like. According to an embodiment, the whiteboard is accessed using a cloud-based online service.

Different types of access and authentication mechanisms may be used to access the whiteboard. Generally, permissions are set to allow one or more users to access the same whiteboard. For example, permissions may be set to allow access to a first group of users while restricting access to users outside of the group. Users may also be invited to access a whiteboard created by a user. According to an embodiment, when a user has accessed the whiteboard in the past they are allowed to access the whiteboard in the future unless the permissions are changed.

Authentication may range from weak authentication to strong authentication. For example, no authentication mechanism may be used, a username and password may be used, an identifier may be used, biometrics may be used, and the like. The authentication may include allowed devices and applications to access the whiteboard. For example an application on the user's smart phone may be allowed to act as a virtual keyboard for the computing device displaying the whiteboard. The computing devices may be paired using network connections, such as Bluetooth, Wi-Fi, Ethernet, and the like. The connection may be initiated using methods such as: manual pairing, Near Field Communication (NFC) triggering, and scanning a barcode to identify the connection information, and the like.

Transitioning to operation 720, the whiteboard is displayed. The whiteboard may be displayed on one or more displays. For example, a user may display a portion of the whiteboard on one display and another portion of the whiteboard on a second display. The displayed whiteboard can store and display many different types of content. For example, a whiteboard may include, but is not limited to: typed and handwritten notes, documents, links, web pages, shared displays, tables and charts, sketches, videos and other media, and the like.

Flowing to operation 730, real-time interaction information that is associated with a remote user currently using and interacting with the whiteboard is received. The real-time interaction information may be received directly from the remote client and/or through one or more intermediary locations (e.g. cloud service). The real-time interaction information may be sent using a same communication channel as committed changes to the whiteboard are sent and/or a different communication channel. The real-time interaction information includes information relating to real time changes to the whiteboard and users currently using the whiteboard. For example, the real-time interaction information may include information relating to: location(s) a remote user is touching the whiteboard; locations where a stylus is near the whiteboard (e.g. acting as a pointer); a location where a stylus is in contact with the whiteboard (inking); information relating to an object a remote user is interacting with (e.g. touching, performing an action on, and the like); changes to a remote user's whiteboard viewport (e.g. the user changed what portion of the whiteboard they are looking at); when a remote user enters and leaves the whiteboard; and the like.

Transitioning to operation 740, the display of the whiteboard is automatically updated to reflect the real-time interaction information. The update to the whiteboard is an approximation of an action being performed by a remote user before the change is committed to the whiteboard. The whiteboard may be updated to display information relating to when a remote user enters/leaves the whiteboard. For example, when a remote user joins the whiteboard a notification element may be temporarily displayed indicating the remote user has entered or exited the whiteboard. Touch locations of where a remote user is touching may be displayed on the whiteboard. For example, finger locations of a remote user may be shown on the display when they are touching/nearly touching the whiteboard display.

The whiteboard may be updated to show current interactions with an object. For example, the whiteboard may be updated to show a remote user resizing an object, moving the object on the whiteboard and the like. Instead of the whiteboard object abruptly changing to a new location or being displayed differently, the user can see the change occurring as it is being performed by the user.

Current inking information may be shown on the display. For example, as the remote user is inking, an approximation of the inking may be displayed using received inking positions as they occurring. According to an embodiment, the inking is displayed such that it appears "wet" on the screen and when the inking is committed it changes to a "dry" appearance. For example, the wet ink may appear darker than the dried ink. A current location of the inking stylus may also be shown.

Changes to a whiteboard viewport by a remote user may also be shown. For example, graphical user elements may be displayed on the whiteboard that indicate a current location of where the remote user is positioned (e.g. viewing) the whiteboard. The whiteboard may also reflect what users are tracking a view of another user. For example, some users may be tracking the actions of a remote user. An indication of what users are tracking another user may be displayed on the whiteboard. For example, the graphical elements representing the users who are tracking another user may be displayed near each other on the whiteboard.

A current view of the user's whiteboard may be automatically adjusted when they are tracking a remote user. For example, when the remote user changes their current position in the whiteboard, the real-time interaction is received from the remote user and the user's view of the whiteboard is updated to reflect the new position.

Flowing to operation 750, a change notification is received. The change notification indicates that a change has been committed to the whiteboard. According to an embodiment, the change notification is received from the whiteboard service after it has been committed to a data store. The change notifications may be sent using the same channel as the real-time user notifications and/or a different communication channel.

Transitioning to operation 760, the display is updated to reflect the committed change. For example, the approximation of the inking is replaced with the inking committed to the data store. The process flows to an end operation and returns to processing other actions.

Figure 8:
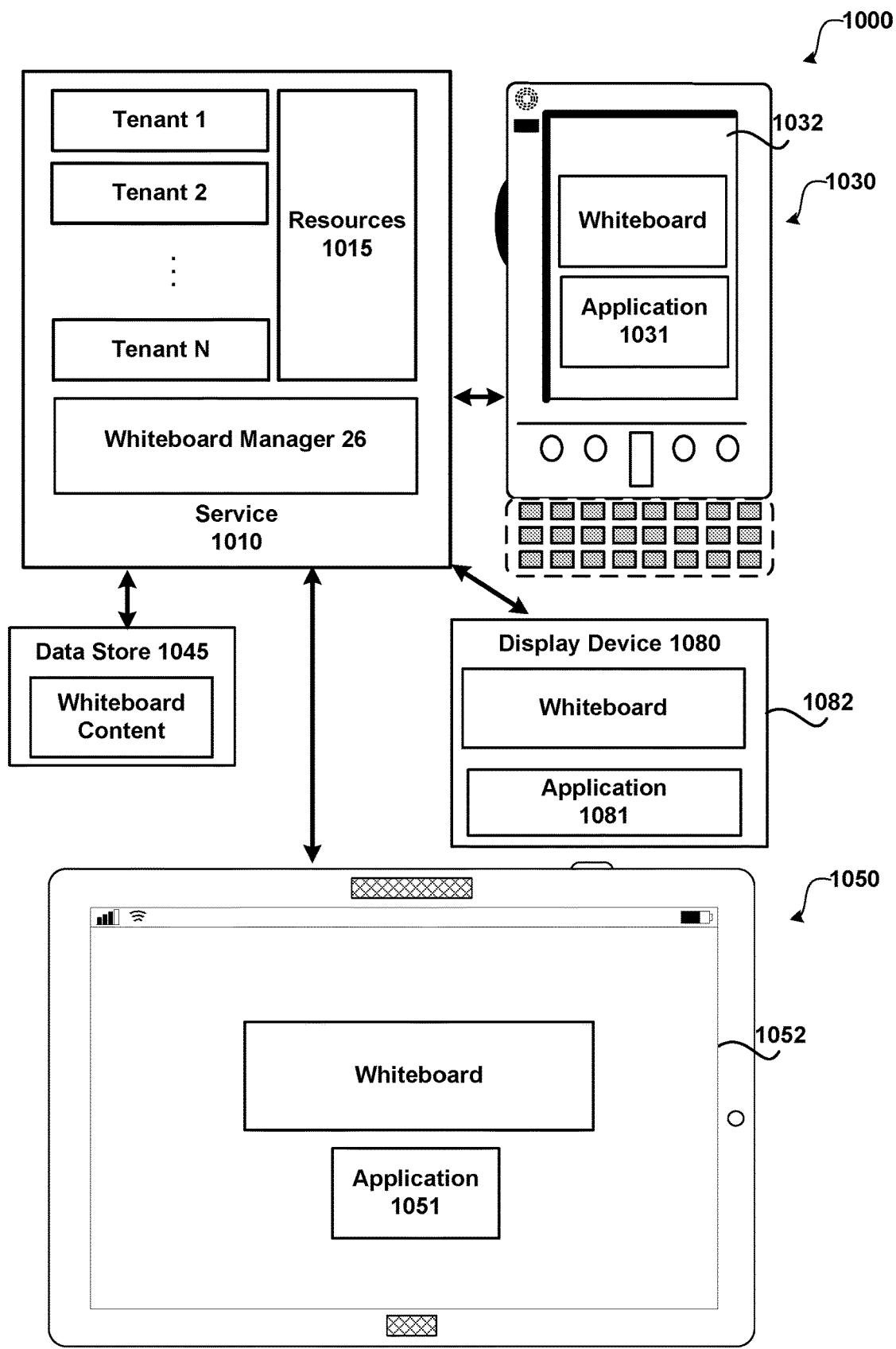
FIG. 8 illustrates an exemplary online system for showing interactions associated with a whiteboard as they occur.

FIG. 8 illustrates an exemplary online system for showing interactions associated with a whiteboard as they occur. As illustrated, system 1000 includes service 1010, data store 1045, touch screen input device 1050 (e.g. a tablet/slate), smart phone 1030 and display device 1080. As illustrated, service 1010 is a cloud based and/or enterprise based service that may be configured to provide services, such as whiteboard services related to various applications or productivity services (e.g. spreadsheets, documents, presentations, charts, messages, and the like)). The service may be interacted with using different types of input/output. For example, a user may use speech input, touch input, hardware based input, and the like. The service may provide speech output that combines pre-recorded speech and synthesized speech. Functionality of one or more of the services/applications provided by service 1010 may also be configured as a client/server based application.

As illustrated, service 1010 is a multi-tenant service that provides resources 1015 and services to any number of tenants (e.g. Tenants 1-N). Multi-tenant service 1010 is a cloud based service that provides resources/services 1015 to tenants subscribed to the service and maintains each tenant's data separately and protected from other tenant data.

System 1000 as illustrated comprises a touch screen input device 1050 (e.g. a slate/tablet device) and smart phone 1030 that detects when a touch input has been received (e.g. a finger touching or nearly touching the touch screen). Any type of touch screen may be utilized that detects a user's touch input. For example, the touch screen may include one or more layers of capacitive material that detects the touch input. Other sensors may be used in addition to or in place of the capacitive material. For example, Infrared (IR) sensors may be used. According to an embodiment, the touch screen is configured to detect objects that in contact with or above a touchable surface. Although the term "above" is used in this description, it should be understood that the orientation of the touch panel system is irrelevant. The term "above" is intended to be applicable to all such orientations. The touch screen may be configured to determine locations of where touch input is received (e.g. a starting point, intermediate points and an ending point). Actual contact between the touchable surface and the object may be detected by any suitable means, including, for example, by a vibration sensor or microphone coupled to the touch panel. A non-exhaustive list of examples for sensors to detect contact includes pressure-based mechanisms, micro-machined accelerometers, piezoelectric devices, capacitive sensors, resistive sensors, inductive sensors, laser vibrometers, and LED vibrometers.

According to an embodiment, smart phone 1030, touch screen input device 1050, and device 1080 are configured with multimodal input/output and each include an application (1031, 1051, 1081) that is used in interacting with a whiteboard. As illustrated, touch screen input device 1050, smart phone 1030, and display device 1080 shows exemplary displays 1052/1032/1082 showing the use of an application, such as a whiteboard application. Data may be stored on a device (e.g. smart phone 1030, slate 1050 and/or at some other location (e.g. network data store 1045). Data store 1045, or some other store, may be used to store whiteboard content and information as well as other data. The applications used by the devices may be client based applications, server based applications, cloud based applications and/or some combination. According to an embodiment, display device 1080 is a device such as a MICROSOFT XBOX coupled to a display.

Whiteboard manager 26 is configured to perform operations relating to showing interactions as they occur on a whiteboard as described herein. While manager 26 is shown within service 1010, the functionality of the manager may be included in other locations (e.g. on smart phone 1030 and/or slate device 1050 and/or device 1080).

The embodiments and functionalities described herein may operate via a multitude of computing systems including, without limitation, desktop computer systems, wired and wireless computing systems, mobile computing systems (e.g., mobile telephones, netbooks, tablet or slate type computers, notebook computers, and laptop computers), handheld devices, multiprocessor systems, microprocessor-based or programmable consumer electronics, minicomputers, and mainframe computers.

In addition, the embodiments and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Figure 9:
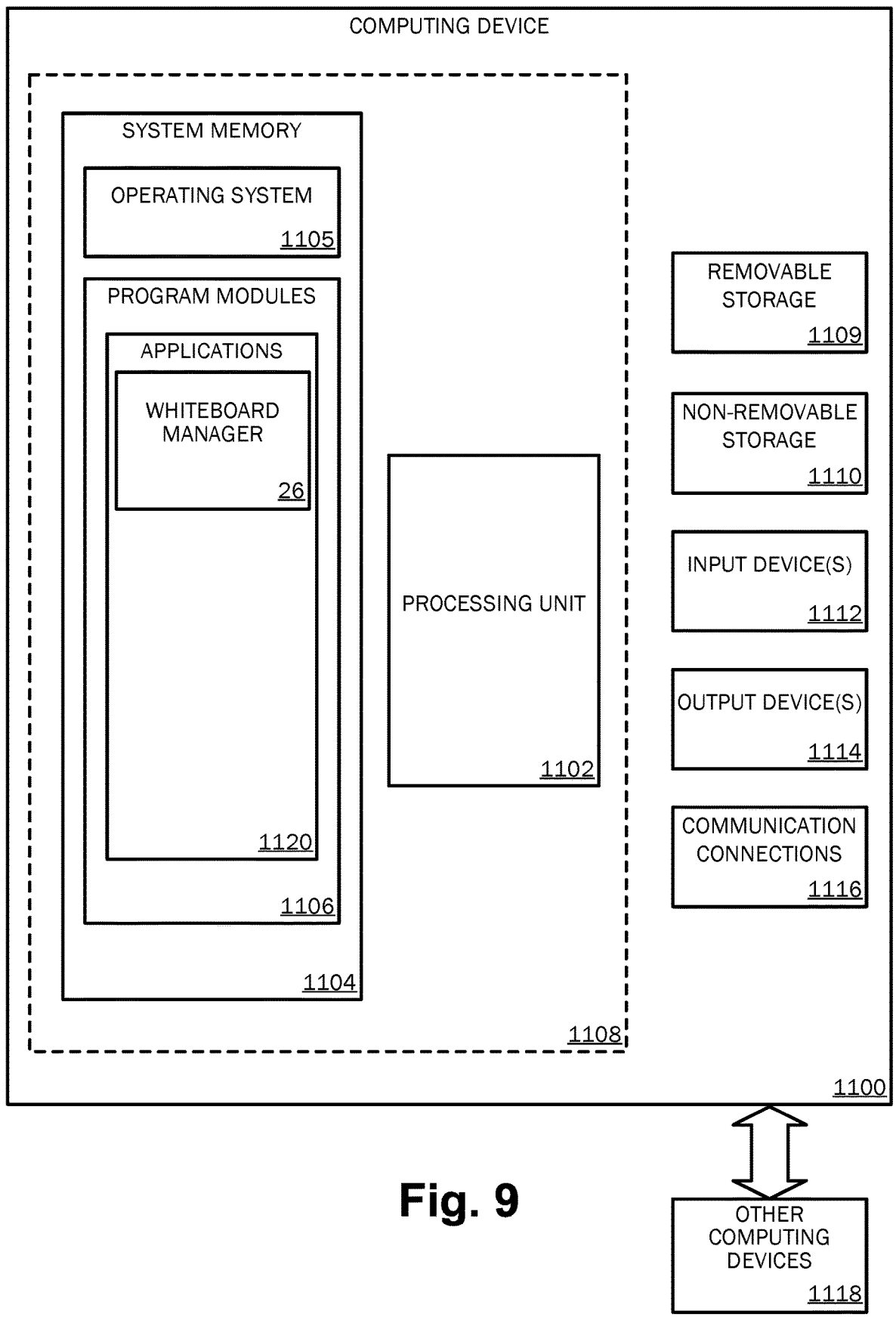
FIG. 9 is a block diagram illustrating example physical components of a computing device.
Figure 10A:
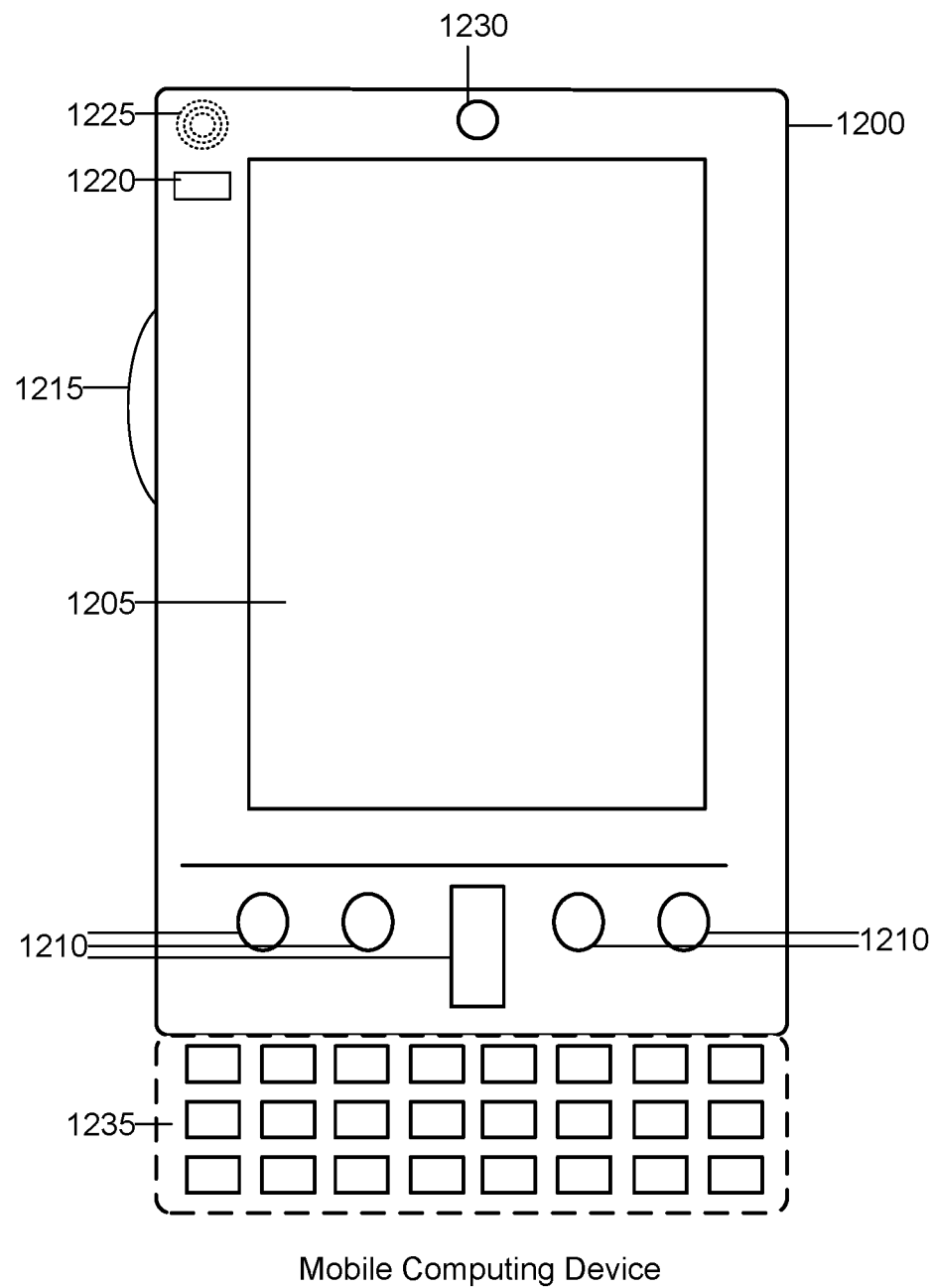
FIG. 10A illustrates a mobile computing environment.
Figure 10B:
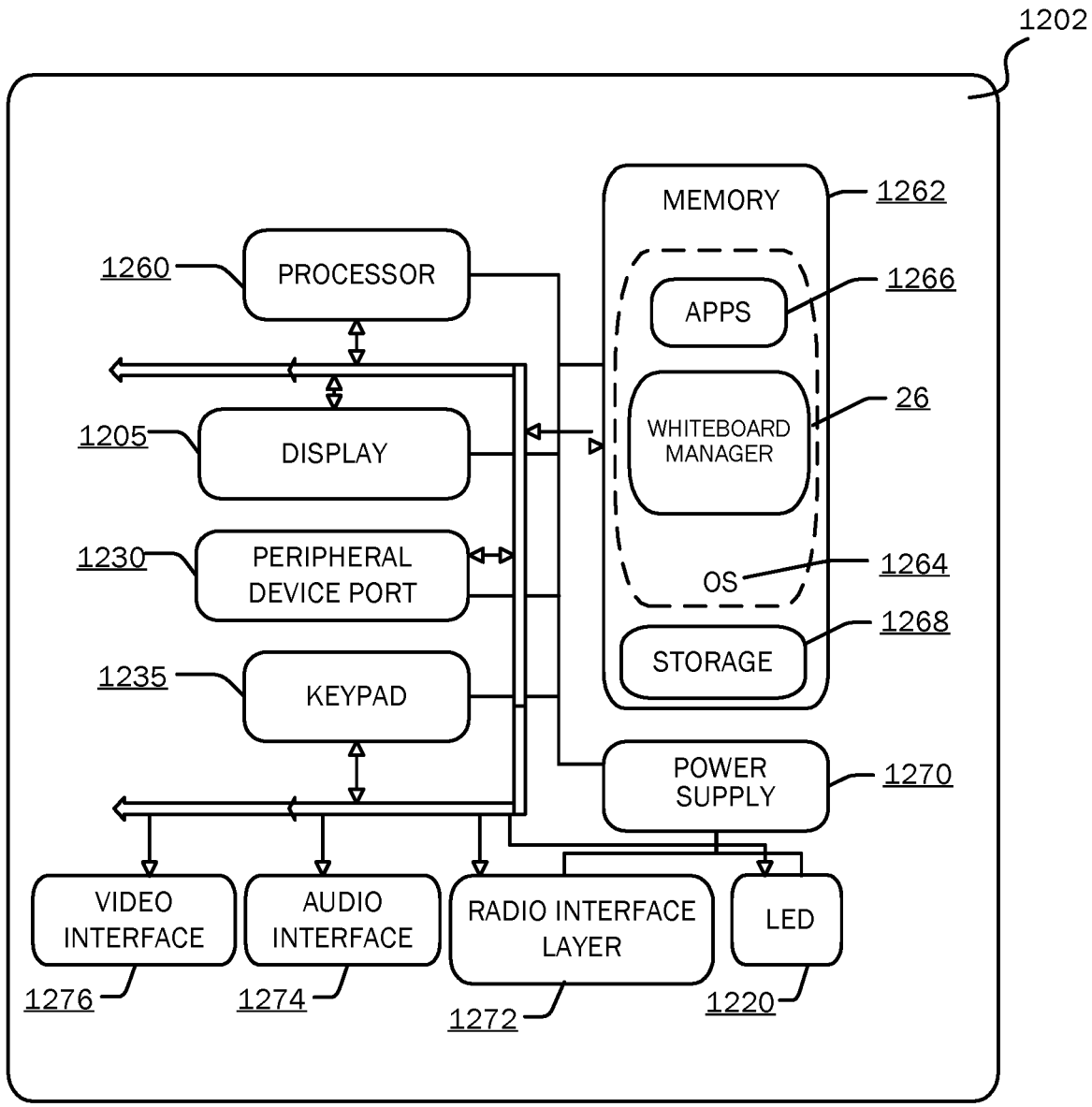
FIG. 10B is a block diagram illustrating components of a mobile computing device.
Figure 11:
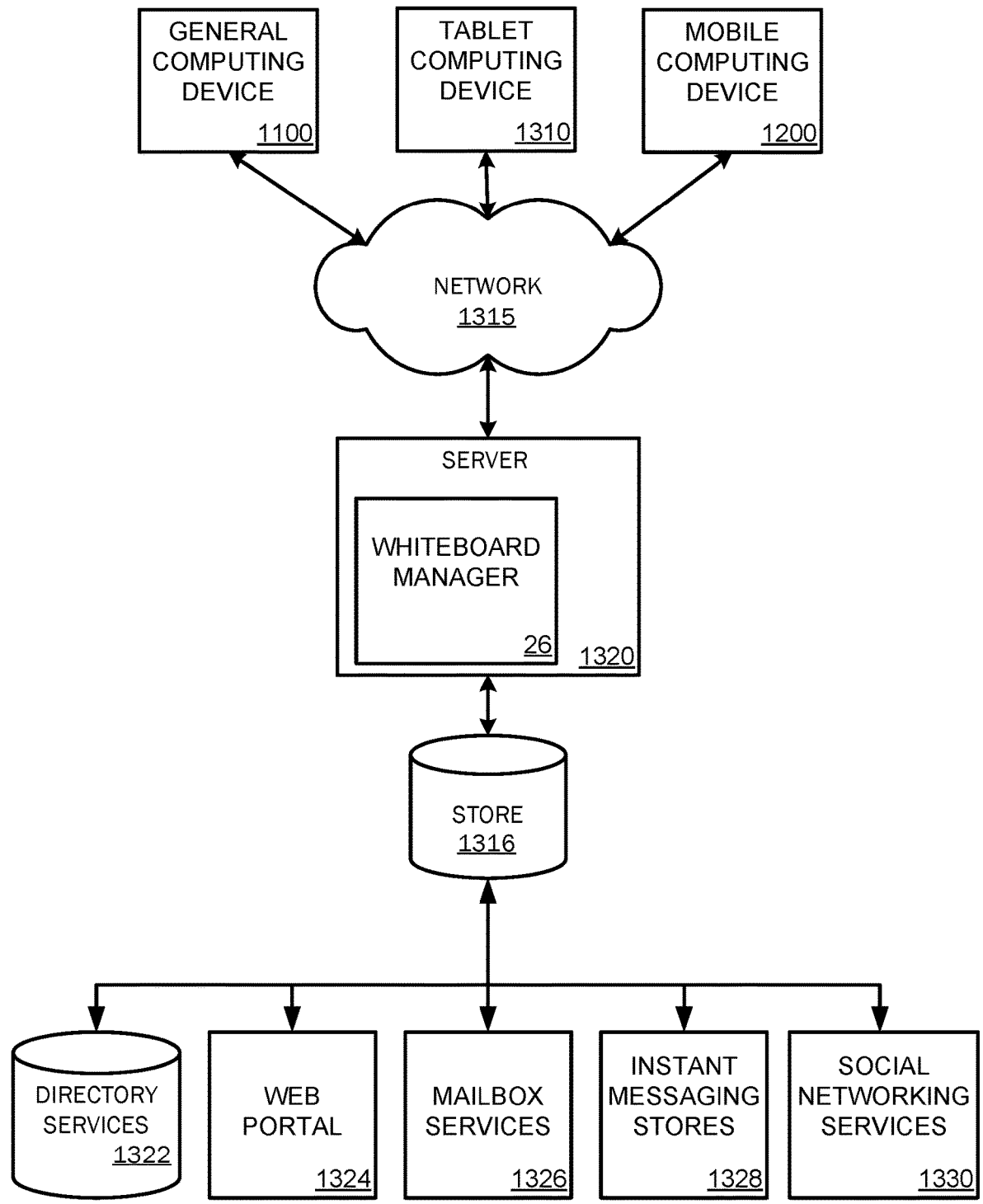
FIG. 11 illustrates an exemplary system architecture.

FIGS. 9-11 and the associated descriptions provide a discussion of a variety of operating environments in which embodiments of the invention may be practiced. However, the devices and systems illustrated and discussed with respect to FIGS. 9-11 are for purposes of example and illustration and are not limiting of a vast number of computing device configurations that may be utilized for practicing embodiments of the invention, described herein.

FIG. 9 is a block diagram illustrating physical components (i.e., hardware) of a computing device 1100 with which embodiments of the invention may be practiced. The computing device components described below may be suitable for the computing devices described above. In a basic configuration, the computing device 1100 may include at least one processing unit 1102 and a system memory 1104. Depending on the configuration and type of computing device, the system memory 1104 may comprise, but is not limited to, volatile storage (e.g., random access memory), non-volatile storage (e.g., read-only memory), flash memory, or any combination of such memories. The system memory 1104 may include an operating system 1105 and one or more program modules 1106 suitable for running software applications 1120 such as the whiteboard manager 26. The operating system 1105, for example, may be suitable for controlling the operation of the computing device 1100. Furthermore, embodiments of the invention may be practiced in conjunction with a graphics library, other operating systems, or any other application program and is not limited to any particular application or system. This basic configuration is illustrated in FIG. 9 by those components within a dashed line 1108. The computing device 1100 may have additional features or functionality. For example, the computing device 1100 may also include additional data storage devices (removable and/or non-removable) such as, for example, magnetic disks, optical disks, or tape. Such additional storage is illustrated in FIG. 9 by a removable storage device 1109 and a non-removable storage device 1110.

As stated above, a number of program modules and data files may be stored in the system memory 1104. While executing on the processing unit 1102, the program modules 1106 (e.g., the whiteboard manager 26) may perform processes including, but not limited to, one or more of the stages of the methods and processes illustrated in the figures. Other program modules that may be used in accordance with embodiments of the present invention may include electronic mail and contacts applications, word processing applications, spreadsheet applications, database applications, slide presentation applications, drawing or computer-aided application programs, etc.

Furthermore, embodiments of the invention may be practiced in an electrical circuit comprising discrete electronic elements, packaged or integrated electronic chips containing logic gates, a circuit utilizing a microprocessor, or on a single chip containing electronic elements or microprocessors. For example, embodiments of the invention may be practiced via a system-on-a-chip (SOC) where each or many of the components illustrated in FIG. 9 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the whiteboard manager 26 may be operated via application-specific logic integrated with other components of the computing device 1100 on the single integrated circuit (chip). Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

The computing device 1100 may also have one or more input device(s) 1112 such as a keyboard, a mouse, a pen, a sound input device, a touch input device, etc. The output device(s) 1114 such as a display, speakers, a printer, etc. may also be included. The aforementioned devices are examples and others may be used. The computing device 1100 may include one or more communication connections 1116 allowing communications with other computing devices 1118. Examples of suitable communication connections 1116 include, but are not limited to, RF transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 1104, the removable storage device 1109, and the non-removable storage device 1110 are all computer storage media examples (i.e., memory storage.) Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 1100. Any such computer storage media may be part of the computing device 1100. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

FIGS. 10A and 10B illustrate a mobile computing device 1200, for example, a mobile telephone, a smart phone, a tablet personal computer, a laptop computer, and the like, with which embodiments of the invention may be practiced. With reference to FIG. 10A, one embodiment of a mobile computing device 1200 for implementing the embodiments is illustrated. In a basic configuration, the mobile computing device 1200 is a handheld computer having both input elements and output elements. The mobile computing device 1200 typically includes a display 1205 and one or more input buttons 1210 that allow the user to enter information into the mobile computing device 1200. The display 1205 of the mobile computing device 1200 may also function as an input device (e.g., a touch screen display). If included, an optional side input element 1215 allows further user input. The side input element 1215 may be a rotary switch, a button, or any other type of manual input element. In alternative embodiments, mobile computing device 1200 may incorporate more or less input elements. For example, the display 1205 may not be a touch screen in some embodiments. In yet another alternative embodiment, the mobile computing device 1200 is a portable phone system, such as a cellular phone. The mobile computing device 1200 may also include an optional keypad 1235. Optional keypad 1235 may be a physical keypad or a "soft" keypad generated on the touch screen display. In various embodiments, the output elements include the display 1205 for showing a graphical user interface (GUI), a visual indicator 1220 (e.g., a light emitting diode), and/or an audio transducer 1225 (e.g., a speaker). In some embodiments, the mobile computing device 1200 incorporates a vibration transducer for providing the user with tactile feedback. In yet another embodiment, the mobile computing device 1200 incorporates input and/or output ports, such as an audio input (e.g., a microphone jack), an audio output (e.g., a headphone jack), and a video output (e.g., a HDMI port) for sending signals to or receiving signals from an external device.

FIG. 10B is a block diagram illustrating the architecture of one embodiment of a mobile computing device. That is, the mobile computing device 1200 can incorporate a system 1202 (i.e., an architecture) to implement some embodiments. In one embodiment, the system 1202 is implemented as a "smart phone" capable of running one or more applications (e.g., browser, e-mail, calendaring, contact managers, messaging clients, games, and media clients/players). In some embodiments, the system 1202 is integrated as a computing device, such as an integrated personal digital assistant (PDA) and wireless phone.

One or more application programs 1266 may be loaded into the memory 1262 and run on or in association with the operating system 1264. Examples of the application programs include phone dialer programs, e-mail programs, personal information management (PIM) programs, word processing programs, spreadsheet programs, Internet browser programs, messaging programs, and so forth. The system 1202 also includes a non-volatile storage area 1268 within the memory 1262. The non-volatile storage area 1268 may be used to store persistent information that should not be lost if the system 1202 is powered down. The application programs 1266 may use and store information in the non-volatile storage area 1268, such as e-mail or other messages used by an e-mail application, and the like. A synchronization application (not shown) also resides on the system 1202 and is programmed to interact with a corresponding synchronization application resident on a host computer to keep the information stored in the non-volatile storage area 1268 synchronized with corresponding information stored at the host computer. As should be appreciated, other applications may be loaded into the memory 1262 and run on the mobile computing device 1200, including the whiteboard manager 26 as described herein.

The system 1202 has a power supply 1270, which may be implemented as one or more batteries. The power supply 1270 might further include an external power source, such as an AC adapter or a powered docking cradle that supplements or recharges the batteries.

The system 1202 may also include a radio 1272 that performs the function of transmitting and receiving radio frequency communications. The radio 1272 facilitates wireless connectivity between the system 1202 and the "outside world," via a communications carrier or service provider. Transmissions to and from the radio 1272 are conducted under control of the operating system 1264. In other words, communications received by the radio 1272 may be disseminated to the application programs 1266 via the operating system 1264, and vice versa.

The visual indicator 1220 may be used to provide visual notifications, and/or an audio interface 1274 may be used for producing audible notifications via the audio transducer 1225. In the illustrated embodiment, the visual indicator 1220 is a light emitting diode (LED) and the audio transducer 1225 is a speaker. These devices may be directly coupled to the power supply 1270 so that when activated, they remain on for a duration dictated by the notification mechanism even though the processor 1260 and other components might shut down for conserving battery power. The LED may be programmed to remain on indefinitely until the user takes action to indicate the powered-on status of the device. The audio interface 1274 is used to provide audible signals to and receive audible signals from the user. For example, in addition to being coupled to the audio transducer 1225, the audio interface 1274 may also be coupled to a microphone to receive audible input, such as to facilitate a telephone conversation. In accordance with embodiments of the present invention, the microphone may also serve as an audio sensor to facilitate control of notifications, as will be described below. The system 1202 may further include a video interface 1276 that enables an operation of an on-board camera to record still images, video stream, and the like.

A mobile computing device 1200 implementing the system 1202 may have additional features or functionality. For example, the mobile computing device 1200 may also include additional data storage devices (removable and/or non-removable) such as, magnetic disks, optical disks, or tape. Such additional storage is illustrated in FIG. 10B by the non-volatile storage area 1268. Mobile computing device 1200 may also include peripheral device port 1230.

Data/information generated or captured by the mobile computing device 1200 and stored via the system 1202 may be stored locally on the mobile computing device 1200, as described above, or the data may be stored on any number of storage media that may be accessed by the device via the radio 1272 or via a wired connection between the mobile computing device 1200 and a separate computing device associated with the mobile computing device 1200, for example, a server computer in a distributed computing network, such as the Internet. As should be appreciated such data/information may be accessed via the mobile computing device 1200 via the radio 1272 or via a distributed computing network. Similarly, such data/information may be readily transferred between computing devices for storage and use according to well-known data/information transfer and storage means, including electronic mail and collaborative data/information sharing systems.

FIG. 11 illustrates an embodiment of an architecture of an exemplary system, as described above. Content developed, interacted with, or edited in association with the whiteboard manager 26 may be stored in different communication channels or other storage types. For example, various documents may be stored using a directory service 1322, a web portal 1324, a mailbox service 1326, an instant messaging store 1328, or a social networking site 1330. The whiteboard manager 26 may use any of these types of systems or the like for enabling data utilization, as described herein. A server 1320 may provide the whiteboard manager 26 to clients. As one example, the server 1320 may be a web server providing the whiteboard manager 26 over the web. The server 1320 may provide the whiteboard manager 26 over the web to clients through a network 1315. By way of example, the client computing device may be implemented as the computing device 1100 and embodied in a personal computer, a tablet computing device 1310 and/or a mobile computing device 1200 (e.g., a smart phone). Any of these embodiments of the client computing device 1100, 1310, and 1200 may obtain content from the store 1316.

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more embodiments provided in this application are not intended to limit or restrict the scope of the invention as claimed in any way. The embodiments, examples, and details provided in this application are considered sufficient to convey possession and enable others to make and use the best mode of claimed invention. The claimed invention should not be construed as being limited to any embodiment, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate embodiments falling within the spirit of the broader aspects of the general inventive concept embodied in this application that do not depart from the broader scope of the claimed invention.

What is claimed is:

1. A method for showing interactions on a whiteboard, comprising:
   providing a whiteboard that is shared across a plurality of remote clients including at least a first remote client and a second remote client;
   detecting an interaction with the whiteboard at the first remote client, the interaction being displayed on the whiteboard at the first remote client using a first visual display method;
   determining a state of the interaction;
   while the interaction is in a non-committed state, displaying an approximation of the interaction on the whiteboard at the second remote client using a second visual display method that is distinct from the first visual display method used to display the interaction on the whiteboard at the first remote client; and
   while the interaction is in a committed state, displaying the interaction on the whiteboard at the second remote client using the first visual display method such that the interaction is visually displayed the same on the whiteboard at both the first remote client and the second remote client.

2. The method of claim 1, wherein displaying the approximation of the interaction on the whiteboard at the second remote client comprises displaying a location of a touch interaction with the whiteboard detected at the first remote client.

3. The method of claim 1, wherein displaying the approximation of the interaction on the whiteboard at the second remote client comprises displaying an inking interaction while the inking is occurring on the whiteboard at the first remote client.

4. The method of claim 3, further comprising displaying a current location of an input device used to make the inking interaction while the inking is occurring.

5. The method of claim 1, further comprising displaying a view indicator on the whiteboard that identifies a portion of the whiteboard currently being viewed.

6. The method of claim 1, further comprising identifying a remote user on the whiteboard when one of the plurality of remote clients enters the whiteboard.

7. The method of claim 1, further comprising receiving real-time interaction information while the interaction is occurring and determining the interaction is in the committed state in response to receiving a change notification.

8. The method of claim 1, wherein displaying the approximation of the interaction on the whiteboard at the second remote client comprises displaying a currently occurring inking stroke in a different color from a color used to display a committed inking stroke.

9. The method of claim 1, wherein the interaction, comprises: a location where a touch is detected on the whiteboard by one of the plurality of remote clients; a location where a stylus is pointing on the whiteboard by one of the plurality of remote clients; a change to a whiteboard viewport; and an identifier of an object on the whiteboard being touched.

10. A computer-readable medium storing computer-executable instructions for showing interactions on a whiteboard, comprising:
    providing a whiteboard that is shared across a plurality of remote clients including at least a first remote client and a second remote client;
    detecting an interaction with the whiteboard at the first remote client, the interaction being displayed on the whiteboard at the first remote client using a first visual display method;
    determining a state of the interaction;
    while the interaction is in a non-committed state, displaying an approximation of the interaction on the whiteboard at the second remote client using a second visual display method that is distinct from the first visual display method used to display the interaction on the whiteboard at the first remote client; and
    while the interaction is in a committed state, displaying the interaction on the whiteboard at the second remote client using the first visual display method such that the interaction is visually displayed the same on the whiteboard at both the first remote client and the second remote client.

11. The computer-readable medium of claim 10, wherein displaying the approximation of the interaction on the whiteboard at the second remote client comprises displaying a location of a touch interaction with the whiteboard detected at the first remote client.

12. The computer-readable medium of claim 10, further comprising displaying a user indicator on the whiteboard that identifies a portion of the whiteboard currently being viewed by one of the first remote client and the second remote client.

13. The computer-readable medium of claim 10, further comprising identifying a remote user on the whiteboard when one of the first remote client and the second remote client enters the whiteboard and displaying an indication when the remote user leaves the display whiteboard.

14. The computer-readable medium of claim 10, further comprising receiving real-time interaction information from the first remote client and determining the interaction is in the committed state in response to receiving a change notification.

15. The computer-readable medium of claim 10, wherein displaying the approximation of the interaction on the whiteboard at the second remote client comprises displaying a currently occurring inking stroke in a different color from a color used to depict a committed inking stroke.

16. The computer-readable medium of claim 10, wherein the interaction, comprises: a location where a touch is detected on the whiteboard by one of the first remote client and the second remote client; a location where a stylus is pointing on the whiteboard by one of the first remote client and the second remote client; a change to a whiteboard viewport; and an identifier of an object on the whiteboard being touched.

17. A system for showing interactions on a whiteboard, comprising:
    a processor and memory;
    an operating environment executing using the processor;
    a whiteboard that is shared between remote clients including at least a first remote client and a second remote client; and
    a manager that is configured to perform actions comprising:
        displaying the whiteboard on the remote clients;
        receiving in real-time an interaction with the whiteboard at the first remote client, the interaction being displayed on the whiteboard at the first remote client using a first visual display method, and the interaction including receiving an inking interaction while the inking is occurring at the first remote client;
        determining a state of the inking interaction is in a non committed state;
        while the inking interaction is in a non-committed state, displaying an approximation of the inking interaction on the whiteboard at the second remote client using a second visual display method that is distinct from the first visual display method used to display the inking interaction on the whiteboard at the first remote client; and
        while the inking interaction is in a committed state, displaying the inking interaction on the whiteboard at the second remote client using the first visual display method such that the inking interaction is visually displayed the same on the whiteboard at both the first remote client and the second remote client.

18. The system of claim 17, wherein displaying the approximation of the inking interaction on the whiteboard at the second remote client comprises displaying a location of a touch interaction with the whiteboard detected at the first remote client.

19. The system of claim 17, wherein displaying the approximation of the inking interaction on the whiteboard at the second remote client comprises displaying a currently occurring inking stroke in a different color from a color used to display a committed inking stroke.

20. The system of claim 17, wherein the interaction, comprises: a location where a touch is detected on the whiteboard; a location where a stylus is pointing on the whiteboard; and a change to a viewport.

* * * * *